United States Patent [19]

Watanabe

[11] Patent Number: 4,620,234

[45] Date of Patent: Oct. 28, 1986

[54] ELECTRONIC VISUAL IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 637,808

[22] Filed: Aug. 6, 1984

[30] Foreign Application Priority Data

Aug. 12, 1983 [JP] Japan ............................... 58-146581

[51] Int. Cl.[4] ......................... H04N 1/04; H04N 1/10

[52] U.S. Cl. ..................................... 358/285; 358/293

[58] Field of Search ............... 358/293, 294, 285, 249, 358/256, 286

[56] References Cited

U.S. PATENT DOCUMENTS

| | | | |
|---|---|---|---|
| 4,160,280 | 7/1979 | Atoji et al. | 358/294 |
| 4,277,805 | 7/1981 | Sato | 358/256 |
| 4,439,790 | 3/1984 | Yoshida | 358/293 |
| 4,498,107 | 2/1985 | Yoshimaru et al. | 358/256 |

FOREIGN PATENT DOCUMENTS

| | | |
|---|---|---|
| 2915512 | 4/1979 | Fed. Rep. of Germany . |
| 2925751 | 6/1979 | Fed. Rep. of Germany . |

OTHER PUBLICATIONS

J. P. Wang; CRT Mounting for Typewriter; Dec. 1981; IBM Technical Disclosure Bulletin; vol. 24, No. 7B.

*Primary Examiner*—Tommy P. Chin
*Assistant Examiner*—John K. Peng
*Attorney, Agent, or Firm*—Cushman, Darby & Cushman

[57] ABSTRACT

An image forming apparatus according to the present invention is provided with a document table provided on a housing for resting a document thereon; an exposure lamp provided under the document table for exposing the document rested on the document table; a pulse motor for moving the exposure lamp to optically scan the document; a photosensitive drum provided in the housing and carrying a latent image thereon corresponding to the image impression of the document; an optical mechanism for guiding the light reflected from the document to the photosensitive drum through an optical path to form the latent image on the photosensitive drum; a CCD image sensor provided in the optical path for reading out the image impression of the document and generating signals representing the image impression; and a liquid crystal display unit provided on the housing for displaying the image impression of the document, based on the signals from the CCD image sensor.

5 Claims, 11 Drawing Figures

ELECTRONIC VISUAL IMAGE FORMING APPARATUS

BACKGROUND OF THE INVENTION

The present invention relates to an image forming apparatus for reading image information of a document and, more particularly, to an image forming apparatus capable of forming on a copying paper sheet a visible image corresponding to the image of the document.

In a conventional image forming apparatus such as an electronic copying apparatus, a document table is fixed on a housing. A document is placed face down on the document table such that a surface to be copied is in contact with the upper surface of the document table. In addition, the document is generally covered with a document cover. Therefore, the operator does not know how the image of the document is copied on the copying sheet until the copied sheet is discharged.

The copying operation is properly performed when the image on the document is concentrated at a central portion. However, when an image extends throughout a possible copying area of the document table and the document is slightly misaligned with respect to a reference position, part of the image copied from the document is lost. In addition to this disadvantage, the operator cannot accurately know which part of the document is enlarged in an enlargement mode. Therefore, this type of copying operation depends on guesswork. In other words, the operator places the document on the document table in roughly the right place. When the image on the copied sheet is faulty or when the document is not completely copied, the operator slightly moves the document with respect to the reference position so as to eliminate the fault or missing portion.

In this manner, when the operator performs a copying operation using the conventional electronic copying apparatus, operational mistakes frequently occur.

SUMMARY OF THE INVENTION

The present invention has been made in consideration of the above situation, and has as its object to provide an image forming apparatus capable of decreasing operational errors, and performing efficient copying and editing, such as trimming.

To attain the above object, according to one aspect of the present invention there is provided an image forming apparatus which comprises a housing; rest means provided on the housing, for resting a document thereon; exposure means provided under the rest means, for exposing the document rested on the rest means; drive means for causing a relative movement between the rest means and exposure means to optically scan the document; an image carrier provided in the housing and carrying a latent image thereon corresponding to the image impression of the document; optical means for guiding the light reflected from the document to the image carrier through an optical path to form the latent image on the image carrier; reading means provided in the optical path, for reading out the image impression of the document and generating signals representing the image impression; and display means provided on the housing, for displaying the image impression of the document, based on the signals from the reading means.

DETAILED DESCRIPTION OF THE PREFERRED EMBODIMENT

An electronic copying apparatus as one embodiment of an image forming apparatus according to the present invention will be described with reference to FIGS. 1 to 9.

Figure 1:
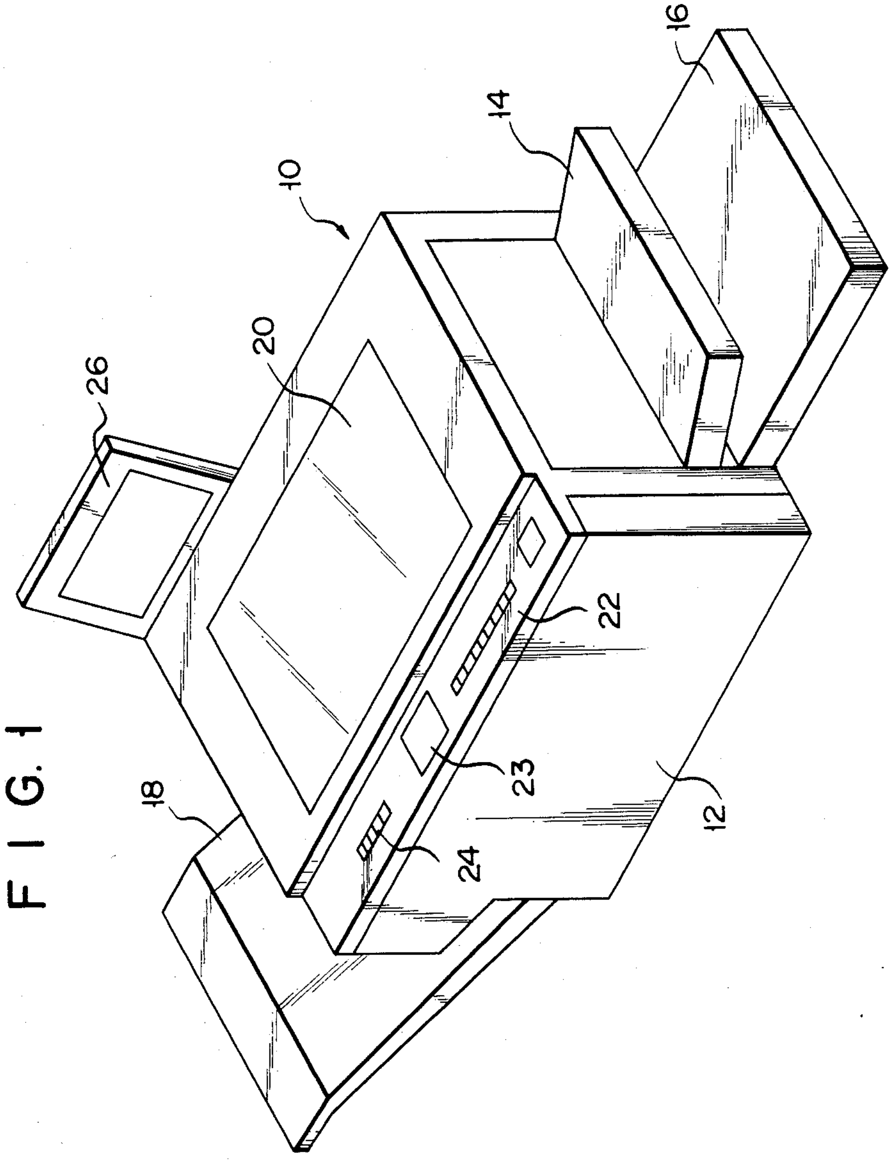
FIG. 1 is a perspective view schematically showing the outer appearance of an electronic copying apparatus to which one embodiment of an image forming apparatus according to the present invention is applied.

FIG. 1 shows the schematic outer appearance of the electronic copying apparatus. An electronic copying apparatus 10 has a housing 12. A pair of upper and lower paper feed cassettes 14 and 16 is detachably mounted at the right side (FIG. 1) of the housing 12. A discharge tray 18 is detachably mounted at the left side (FIG. 1) of the housing 12. Copied sheets (e.g., sheets P having an image corresponding to the image of the document) are stacked on the discharge tray 18.

A document table 20 is fixed substantially at the center of the upper surface of the housing 12. A document (not shown) to be copied is placed face down on the document table 20. An operation panel 22 is arranged at the upper front portion of the housing 12. A preset copy number key, a selection key for selecting one of the cassettes 14 and 16, a start key 23 for starting the copying operation and a magnification factor key 24 are arranged in the operation panel 22, although these keys are not shown in detail. A liquid crystal display unit 26 extends upward from the rear upper portion of the housing 12. An image to be copied is displayed on the liquid crystal display unit 26 by a system to be described later.

Figure 2:
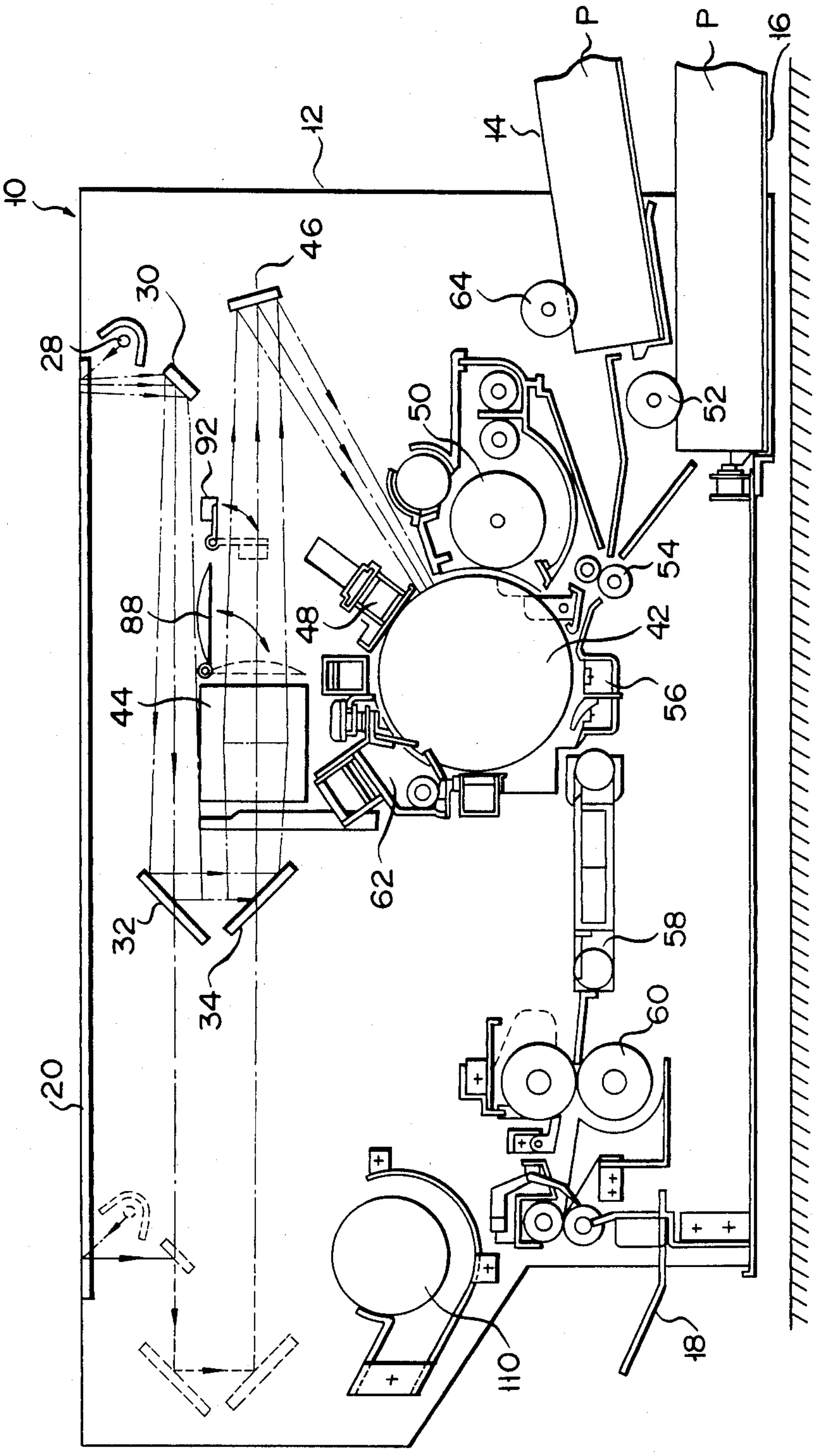
FIG. 2 is a sectional view schematically showing the internal construction of the electronic copying apparatus shown in FIG. 1.

In the housing 12, a document illumination lamp 28 and a first mirror 30 are arranged integrally in the vicinity of the lower surface of the document table 20 so as to be reciprocally movable along the lower surface of the document table 20, as shown in FIG. 2. Furthermore, a second mirror 32 and a third mirror 34 are integrally arranged to the left (FIG. 2) of the lamp 28 and the first mirror 30 to be reciprocally movable along the lower surface of the document table 20. The lamp 28 and the first mirror 30 are fixed on a first carriage 36 (to be described in detail later), and the second and third mirrors 32 and 34 are fixed on a second carriage 38 (also to be described in detail later). The first and second carriages 36 and 38 are moved by a carriage drive mechanism 40 (to be described in detail later) to optically scan the document in such a manner that a constant optical path length is maintained.

A photosensitive drum 42 is arranged substantially at the center of the housing 12 to be rotatable clockwise, as shown in FIG. 2. The document placed on the document table 20 is sequentially illuminated by the lamp 28 from the left end to the right end of the document. Light reflected by the document is focused on the surface of the photosensitive drum 42 through the first mirror 30, the second mirror 32, the third mirror 34, a lens 44 and a fourth mirror 46. A charger 48 is arranged in the vicinity of the photosensitive drum 42 to charge the surface of the photosensitive drum 42. When the charged area is partially exposed with light, the exposed portion is discharged, thereby forming a latent image. The latent image is then developed by a developing unit 50.

When, for example, the lower cassette 16 is selected, paper sheets P held therein are picked up by a pick-up roller 52 one by one. A picked-up sheet P is fed to a pair of resist rollers 54. The paper sheet P is clamped between the resist rollers 54 and is guided to the lower portion of the photosensitive drum 42. A toner image is then transferred by a transfer charger 56 to the paper sheet P.

The sheet P having a transferred image thereon is conveyed to a fixer 60 by means of a conveyor belt 58. The fixer 60 thus fixes the image on the sheet P. The fixed sheet P is discharged onto the discharge tray 18. When the image transfer is completed, the photosensitive drum 42 is cleaned by a cleaner 62 and returns to a position opposing the charger 48.

However, when the upper cassette 14 is selected, the sheets P held therein are picked up by a pick-up roller 64 one by one. The sheet P is then fed to the pair of resist rollers 54 in the same manner as in the lower cassette 16. The sheet is copied through the photosensitive drum 42, the conveyor belt 58 and the fixer 60. The copied sheet P is then discharged into the discharge tray 18.

Figure 3:
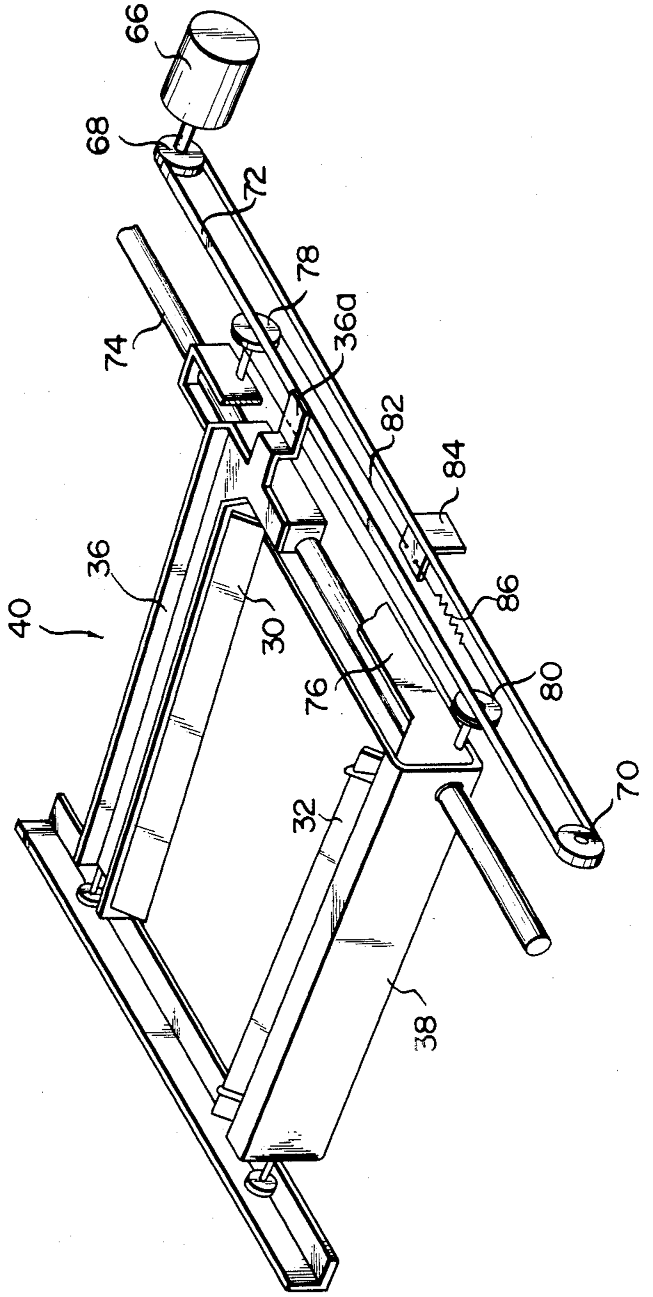
FIG. 3 is a perspective view showing first and second carriages and their drive mechanism of the apparatus of FIG. 1.

FIG. 3 is a perspective view of the carriage drive mechanism 40 for causing a single motor to drive carriages through a belt and a wire so as to perform optical scanning. Referring to FIG. 3, reference numeral 66 denotes a motor as a driving means. A pulley 68 is directly coupled to the motor 66. A belt 72 is looped between the pulley 68 and an idler pulley 70. One end (first fixing portion 36*a*) of a first carriage 36 disposed to be perpendicular to the belt 72 is mounted on the belt 72. A rail 74 is slidably fitted in a second carriage 38 to be substantially parallel to the belt 72. The second carriage 38 is disposed perpendicularly to the belt 72 in the same manner as the first carriage 36. Pulleys 78 and 80 are rotatably mounted on shafts of a guide portion 76 for guiding the rail 74. A wire 82 is looped around the pulleys 78 and 80. One end of the wire 82 is connected to a second fixing portion 84 fixed on the belt 72, and the other end of the wire 82 is fixed on the second fixing portion 84 through a spring 86.

With the construction described above, the pulleys 78 and 80 serve as movable rollers. For this reason, the second carriage 38 having the second and third mirrors 32 and 34 can be moved at a speed half of that of the first carriage 36 having the lamp 28 and the first mirror 30.

Figure 4:
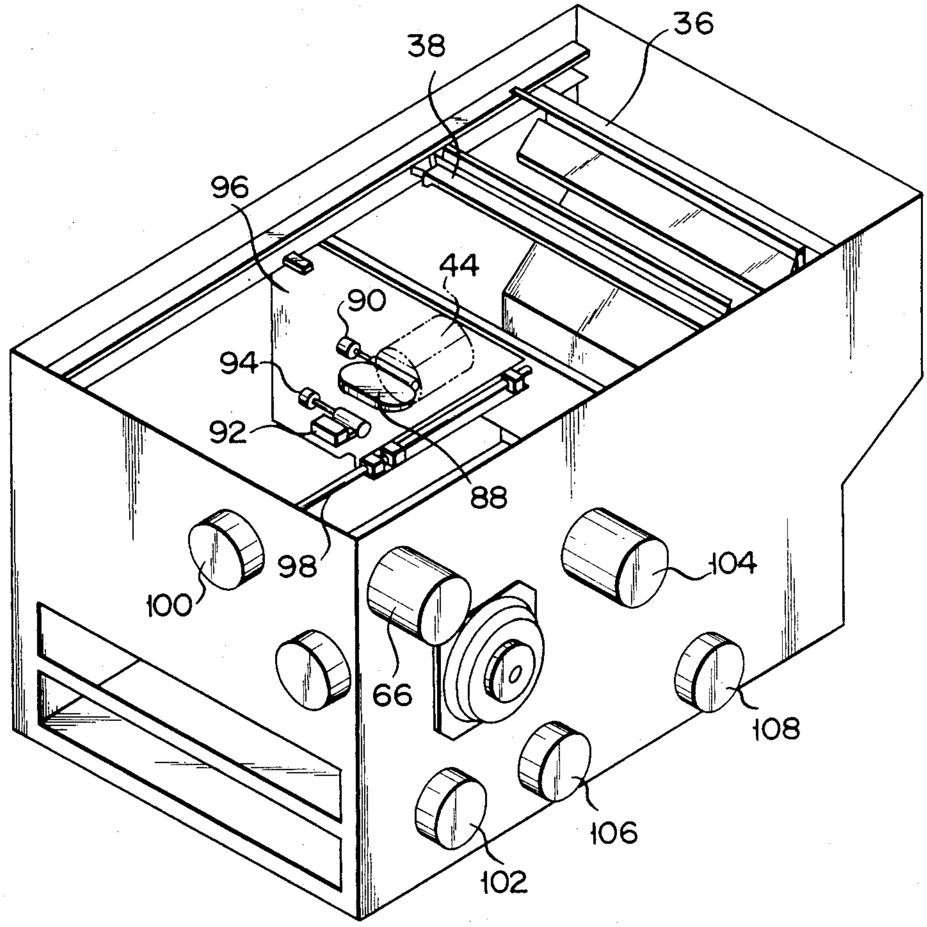
FIG. 4 is a perspective view of the electronic copying apparatus of FIG. 1 when a housing is removed therefrom.
Figure 5A:
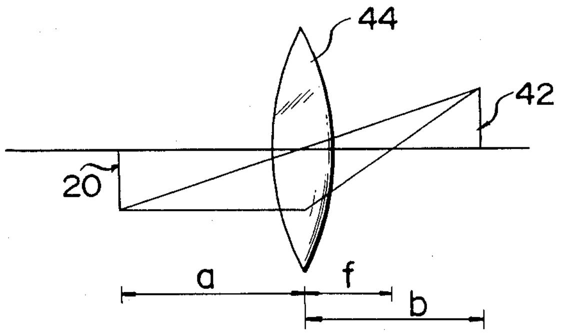
FIGS. 5A to 5C are respectively representations for explaining an optical system of the electronic copying apparatus.
Figure 5B:
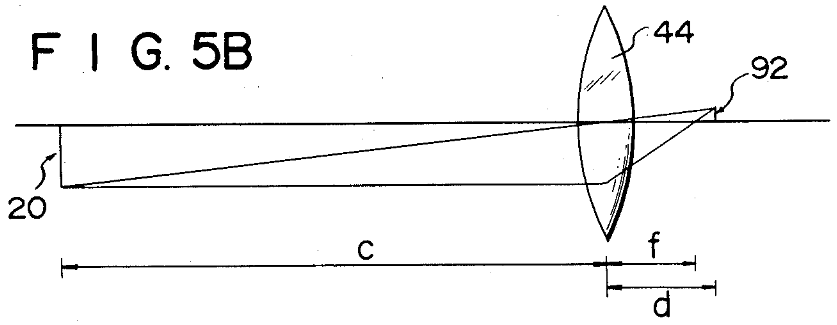
Figure 5C:
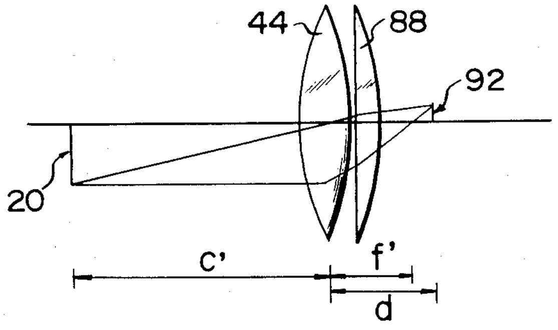

FIG. 4 is a perspective view showing the internal construction within the housing 12, and FIGS. 5A to 5C are representations for explaining the operation of the optical system. Referring to FIG. 4, reference numeral 88 denotes an additional lens arranged in the vicinity of the lens 44. The additional lens 88 is pivotally supported by a first pivot mechanism 90. More specifically, the additional lens 88 is pivoted between a position where the optical path of the lens 44 is not shielded and a position where the optical path is shielded to change the focal length of the lens 44. Reference numeral 92 denotes a CCD image sensor. The CCD image sensor 92 is pivotally supported by a second pivot mechanism 94. The image sensor 92 can be pivoted in the same manner as the lens 88. The additional lens 88 and the CCD image sensor 92 are mounted on the lower surface of a holder 96 for holding the lens 44. The holder 96 is driven by a lens motor 100 coupled through a shaft 98 and is moved horizontally. The first and second pivot mechanisms 90 and 94 may comprise known pulse motors, rotary solenoids, solenoids/links, cams and the like. The first and second carriages 36 and 38 are driven by the scanning pulse motor 66. Reference numeral 102 denotes a resist roller pulse motor for driving the resist rollers 54 shown in FIG. 2; 104 denotes a brushless DC motor for driving the pick-up rollers 52 and 64, the developing unit 50, the photosensitive drum 42 and the fixer 60; 106 denotes a pulse motor for driving the conveyor belt 58; and 108, a pulse motor for driving a cooler 110.

The effect of the additional lens 88 will be described with reference to FIGS. 5A to 5C. The focal length f of the lens 44 generally falls within the range between 190 mm and 230 mm when an A3 size paper sheet is used. Therefore, the length $(a+b)$ of an optical path up to the photosensitive drum 42 falls within the range between 760 mm and 920 mm (FIG. 5A).

The distance d between the lens 44 and the CCD image sensor 92 is about 30 mm, as shown in FIG. 5B. The length $(c+d)$ of an optical path becomes longer than 2 m when an A3 size sheet is used ($c=297$ mm). Therefore, the value of c becomes larger, and the apparatus as a whole inevitably becomes larger. In order to solve this problem, as shown in FIG. 5C, an additional lens 88 is arranged in the vicinity of the lens 44 to decrease the combined focal length f'. Therefore, the relationship $(a+b)=(c'+d)$ or $(a+b)\approx(c'+d)$ can be established.

When light reflected by the document is focused on the photosensitive drum 42 to perform copying, the additional lens 88 and the CCD image sensor 92 are pivoted counterclockwise and fall outside the range of the optical path. However, when the image information is read by the CCD image sensor 92, the additional lens 88 and the CCD 92 are pivoted clockwise by the first and second pivot mechanisms 90 and 94 and are moved into a position to cross the optical path.

Figure 6:
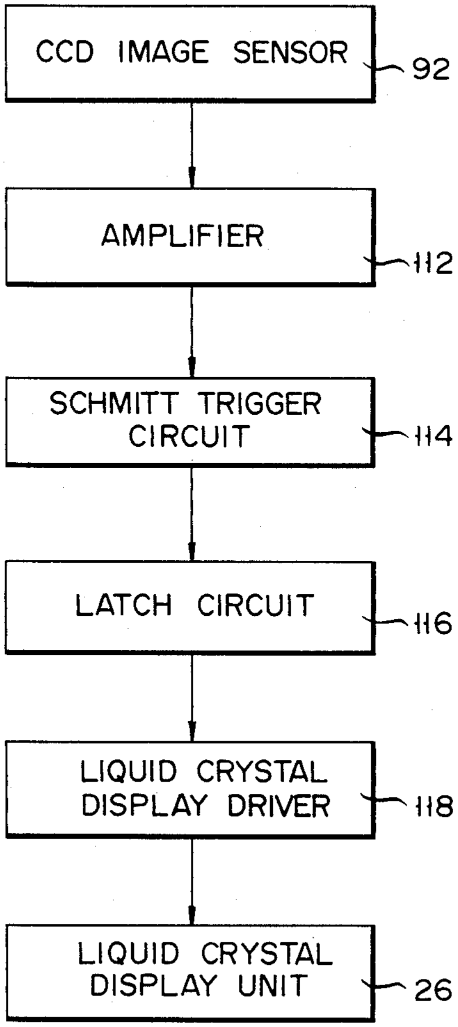
FIG. 6 is a block diagram showing a circuit arrangement for reading an image.

FIG. 6 is a block diagram of a circuit of the image forming apparatus. The principle of the image information display system for displaying the image information of the document on the liquid crystal display unit 26 will be described. The circuit comprises the CCD image sensor 92, an amplifier 112, a Schmitt trigger circuit 114, a latch circuit 116, a liquid crystal display driver 118 and the liquid crystal display unit 26 which are sequentially connected in the order named.

The image display operation of the liquid crystal display unit 26 will be described hereinafter.

In the copy standby state, the first carriage 36 is located at the right end (FIG. 2) of the document table 20. This right end position corresponds to a scan end position when the photosensitive drum 42 is rotated clockwise. In other words, the left position (left end in FIG. 2) of the document table 20 corresponds to the scan start position.

When the copying operation is started, the carriage drive mechanism 40 causes the motor 66 to move the first carriage 36 from the right position to the left position so as to prescan the document. Meanwhile, the additional lens 88 and the CCD image sensor 92 are brought into the position where they cross the optical path. Therefore, light reflected by the document in prescanning is incident on the CCD image sensor 92. Assume that one-line image information is detected by the CCD image sensor 92 which receives the light reflected by the document. The document information is extracted from the CCD image sensor 92 in units of pixel data. The pixel data is then amplified by the amplifier 112 to a predetermined level. The amplified data is digitized by the Schmitt trigger circuit 114. The digital signals are then sequentially latched by the latch circuit 116. When digital signals for one-line document information are latched, the latch circuit 116 supplies one-line document information to the liquid crystal display driver 118. The liquid crystal display driver 118 drives the liquid crystal display unit 26 which then displays the one-line document image. By repeating the above operation, all document image information can be displayed on the liquid crystal display unit 26.

The first carriage 36 located in the left position (i.e., scan start position) is moved to the right position when the operator checks the displayed image on the liquid crystal display unit 26 and depresses a confirmation key (not shown). Therefore, the copying operation described above is performed. In this case, the additional lens 88 and the CCD image sensor 92 are pivoted by the first and second pivot mechanisms 90 and 94 to get out of the optical path and so do not interfere the copying operation. Note that the copying operation need not be performed upon depression of the confirmation key. In this case, the copying operation may be automatically performed when a predetermined period of time (e.g., 5 seconds) is determined by a timer to have elapsed since prescanning was completed. A cancel key can be arranged to stop copying an image when the operator does not wish to copy the image displayed on the liquid crystal display unit 26.

Figure 7:
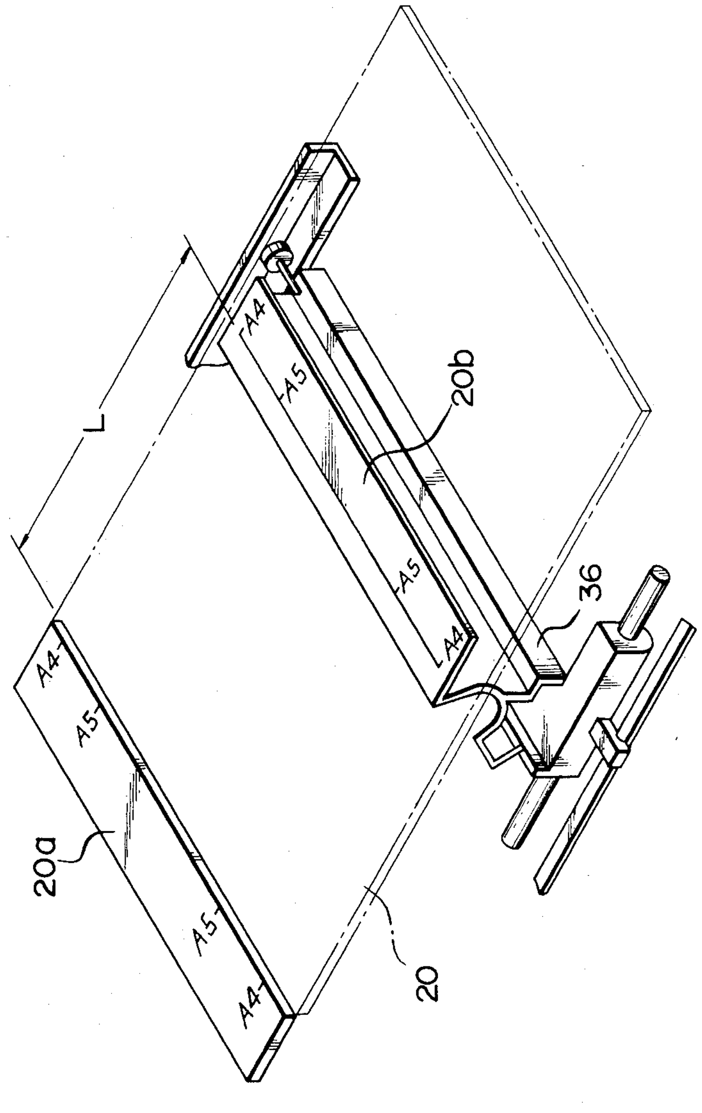
FIG. 7 is a perspective view exclusively showing a document table and the first carriage.
Figure 8:
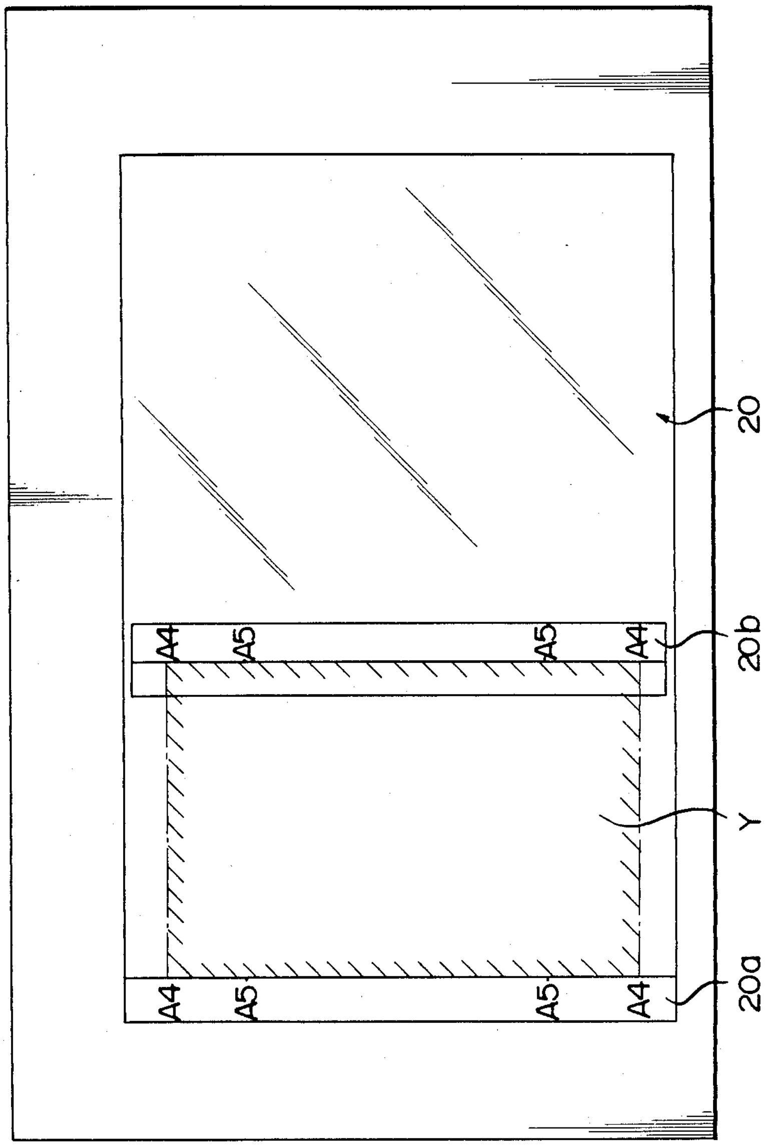
FIG. 8 is a plan view of the document table.
Figure 9:
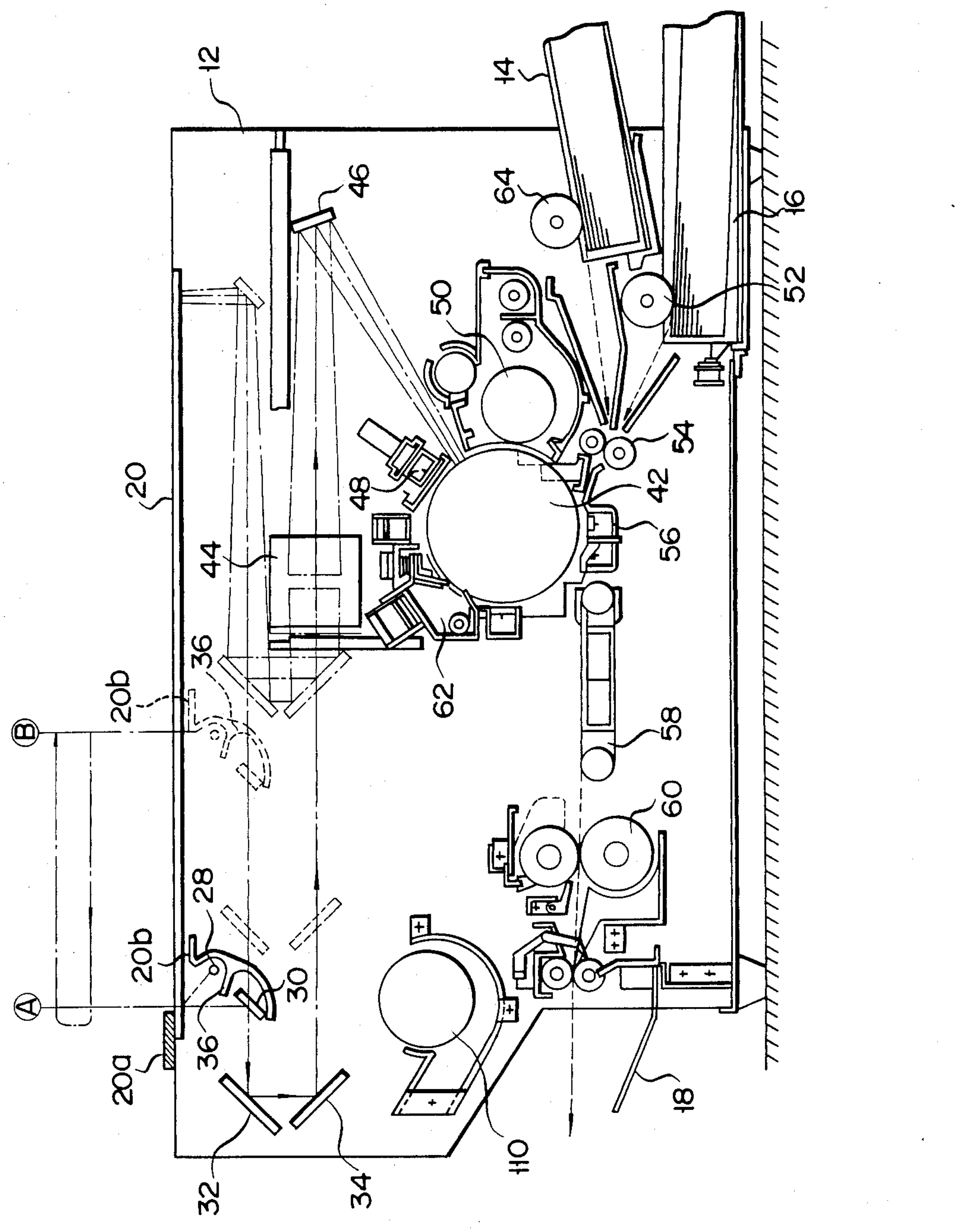
FIG. 9 is a sectional view schematically showing the internal construction of the electronic copying apparatus in an operating state different from that of FIG. 2.

A variable magnification factor document scanning section will be described with reference to FIGS. 7 to 9. Referring to FIGS. 7 to 9, a first scale 20*a* is arranged at one side of the document table 20 to serve as a reference position of the document table 20 and to be aligned with an end of the document. A second scale 20*b* is mounted on the first carriage 36 for scanning the document (FIG. 3) in the vicinity of the lower surface of the document table 20.

A copying operation for copying an image in an equal size mode will first be described. The length of the feed path of the copying sheets P stored in the selected cassette 14 or 16 is defined as l. The first carriage 36 is moved such that the marks on the second scale 20*b* are aligned with a position (L=l) away from the first scale 20*a*. In other words, the second scale 20*b* is located at the point Ⓑ before copying is performed. The operator checks the copy area and places the document on the document table 20 and then starts copying the document. The first mirror 30 mounted on the first carriage 36 prescans the document from the point Ⓑ to the left position (the point Ⓐ in FIG. 9). Thereafter, the copying operation is performed, and the first mirror 30 is returned to the point Ⓑ. When a plurality of copies is required, the above operation is repeated, and the first mirror is returned to and finally stopped at the point Ⓑ.

A copying operation in a magnification factor mode will now be described. A magnification factor is given to be x. The second scale 20*b* is removed by a distance L=l/x from the first scale 20*a*. In this manner, the operator can check a copy area Y of the document whose image is magnified.

According to this embodiment described above, since the liquid crystal display 26 is provided, the operator can check the content of the document and its position on the document table, thereby decreasing operational errors. In addition, trimming and document size discrimination can be easily performed by using the liquid crystal display unit 26 which displays the document content. The document information is read in the forward direction, and copying is performed in the backward direction. In this manner, one cycle of reciprocal movement consists of both information scanning and copying. As a result, the operation time will not be wasted or become lengthened. In addition, the copying area can be directly specified by movement of the carriages, thus providing various advantages.

What is claimed is:

1. An image forming apparatus comprising:

a housing;

rest means provided on the housing, for resting a document thereon;

exposure means provided under the rest means, for exposing the document rested on the rest means;

drive means for causing a relative movement between the rest means and the exposure means to optically scan the document;

an image carrier provided in the housing and carrying a latent image thereon corresponding to the image impression of the document;

optical means for guiding the light reflected from the document to the image carrier through an optical path to form the latent image on the image carrier;

reading means provided in the optical path, for reading out the image impression of the document and generating signals representing the image impression, said reading means being retractable from the optical path, the reading means being set in the optical path when the exposure means advances, said reading means being retracted from the optical path when the exposure means returns; and display means provided on the housing, for displaying the image impression of the document, based on the signals from the reading means.

2. The image forming apparatus according to claim 1, wherein the reading means includes:

an image sensor retractable from the optical path, for reading out the image impression from the reflected light when the image sensor is set in the optical path;

first drive means connected to the image sensor, for setting the image sensor in the optical path when the exposure means advances and retracting the image sensor from the optical path when the exposure means returns;

a focusing lens retractable from the optical path, for focusing the reflected light onto the image sensor; and second drive means connected to the focusing lens, for setting the focusing lens in the optical path when the exposure means advances and retracting the focusing lens from the optical path when the exposure means returns.

3. An image forming apparatus comprising:

a housing;

rest means provided on the housing, for resting a document thereon, said rest means being secured to said housing;

exposure means provided under the rest means, for exposing the document rested on the rest means, said exposure means being movable under said rest means, said exposure means including, a carriage provided under the rest means, and movable between a scan starting position and a scan ending position;

an exposure lamp provided on the carriage, for illuminating the document rested on the rest means, and carriage drive means connected to the carriage, for setting the carriage in the scan ending position, in a stand-by mode, moving the carriage from the scan ending position to the scan starting position in a reading-out mode, and moving the carriage from the scan starting position to the scan ending position in a copying mode;

drive means for causing a relative movement between the rest means and the exposure means to optically scan the document said drive means reciprocally moving said exposure means;

an image carrier provided in the housing and carrying a latent image thereon corresponding to the image impression of the document;

optical means for guiding the light reflected from the document to the image carrier through an optical path to form the latent image on the image carrier;

reading means provided in the optical path, for reading out the image impression of the document and generating signals representing the image impression, said reading means reading out the image impression when the exposure means advances, the latent image being formed on the image carrier when the exposure mean returns; and display means provided on the housing, for displaying the image impression of the document, based on the signals from the reading means.

4. The image forming apparatus according to claim 3, wherein the reading means is retractable from the optical path, the reading means being set in the optical path when the carriage is moved from the scan ending position to the scan starting position, and being retracted from the optical path when the carriage is moved from the scan starting position to the scan ending position.

5. The image forming apparatus according to claim 4, wherein the reading means includes:

an image sensor retractable from the optical path, for reading out the image impression from the reflected light;

first drive means connected to the image sensor, for setting the image sensor in the optical path when the carriage is moved from the scan ending position to the scan starting position and retracting the image sensor from the optical path when the carriage is moved from the scan starting position to the scan ending position;

a focusing lens retractable from the optical path, for focusing the reflected light onto the image sensor; and second drive means connected to the focusing lens, for setting the focusing lens in the optical path when the carriage is moved from the scan ending position to the scan starting position and retracting the focusing lens from the optical path when the carriage is moved from the scan starting position to the scan ending position.

* * * * *